(12) United States Patent
Beck et al.

(10) Patent No.: US 10,794,443 B2
(45) Date of Patent: Oct. 6, 2020

(54) DISC BRAKE FOR A VEHICLE, PARTICULARLY FOR A COMMERCIAL VEHICLE

(71) Applicant: KNORR-BREMSE Systeme fuer Nutzfahrzeuge GmbH, Munich (DE)

(72) Inventors: Thomas Beck, Passau (DE); Wolfgang Pritz, Munich (DE); Michael Hidringer, Hofkirchen (DE); Martin Heindl, Eging am See (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 69 days.

(21) Appl. No.: 15/909,667

(22) Filed: Mar. 1, 2018

(65) Prior Publication Data
US 2018/0187732 A1 Jul. 5, 2018

Related U.S. Application Data

(63) Continuation of application No. PCT/EP2016/070560, filed on Sep. 1, 2016.

(30) Foreign Application Priority Data

Sep. 1, 2015 (DE) .......... 10 2015 114 546

(51) Int. Cl.
*F16D 65/18* (2006.01)
*F16D 65/56* (2006.01)
(Continued)

(52) U.S. Cl.
CPC ....... *F16D 65/183* (2013.01); *F16D 65/0068* (2013.01); *F16D 65/56* (2013.01);
(Continued)

(58) Field of Classification Search
CPC .. F16D 65/183; F16D 65/568; F16D 65/0068; F16D 65/58; F16D 2125/26
See application file for complete search history.

(56) References Cited

U.S. PATENT DOCUMENTS

| 5,547,048 A | 8/1996 | Anthony |
| 5,833,035 A | 11/1998 | Severinsson |

(Continued)

FOREIGN PATENT DOCUMENTS

| CN | 1207798 A | 2/1999 |
| CN | 1326058 A | 12/2001 |

(Continued)

OTHER PUBLICATIONS

Chinese-language Office Action issued in counterpart Chinese Application No. 201680060377.3 dated Feb. 19, 2019 with English translation (11 pages).

(Continued)

*Primary Examiner* — Vishal R Sahni
(74) *Attorney, Agent, or Firm* — Crowell & Moring LLP

(57) ABSTRACT

A disc brake for a vehicle, particularly for a commercial vehicle, includes a brake caliper which straddles a brake disc and in which an application device is arranged, a single-piece rotary lever which has an eccentric element, and at least one brake plunger which is designed as a power screw arrangement having a rotational axis and with which, when the rotary lever is actuated, at least one brake pad can be pressed against the brake disc. The rotary lever is arranged in the brake caliper such that it can pivot relative thereto, and is supported directly or by way of one or more elements connected therebetween, on said brake caliper, in at least one support region. The rotary lever, which can pivot relative to the brake plunger, has at least one convexly-formed section on the side thereof that lies opposite the support point on the brake caliper, and this section lies against a matching concave end face in the axial extension of the rotational axis of said power screw arrangement.

24 Claims, 12 Drawing Sheets

(51) Int. Cl.
*F16D 65/00* (2006.01)
*F16D 65/58* (2006.01)
*F16D 121/14* (2012.01)
*F16D 125/26* (2012.01)
*F16D 125/32* (2012.01)

(52) U.S. Cl.
CPC ............ *F16D 65/568* (2013.01); *F16D 65/58* (2013.01); *F16D 2121/14* (2013.01); *F16D 2125/26* (2013.01); *F16D 2125/32* (2013.01)

(56) References Cited

U.S. PATENT DOCUMENTS

| | | | |
|---|---|---|---|
| 5,927,445 A * | 7/1999 | Bieker | F16D 55/226 188/71.1 |
| 7,134,532 B2 | 11/2006 | Baumgartner et al. | |
| 2001/0030090 A1 | 10/2001 | Thomas et al. | |
| 2002/0017437 A1 | 2/2002 | Ortegren et al. | |
| 2002/0023807 A1* | 2/2002 | Ortegren | F16D 65/52 188/73.31 |
| 2003/0217898 A1 | 11/2003 | Antony | |
| 2004/0026181 A1 | 2/2004 | Baumgartner et al. | |
| 2004/0188189 A1* | 9/2004 | Baumgartner | F16D 55/225 188/71.7 |
| 2005/0211509 A1 | 9/2005 | Severinsson | |
| 2005/0269171 A1 | 12/2005 | Norman et al. | |
| 2005/0284709 A1 | 12/2005 | Sandberg | |
| 2011/0147138 A1* | 6/2011 | Jungmann | F16D 65/18 188/71.7 |
| 2011/0147139 A1 | 6/2011 | Baumgartner et al. | |
| 2012/0073912 A1* | 3/2012 | Camilo-Martinez | F16D 65/183 188/71.7 |
| 2013/0008749 A1* | 1/2013 | Sandberg | F16D 55/227 188/71.8 |
| 2013/0240305 A1* | 9/2013 | Thomas | F16D 65/183 188/72.4 |
| 2014/0216863 A1* | 8/2014 | Weber | F16D 65/183 188/71.9 |

FOREIGN PATENT DOCUMENTS

| | | |
|---|---|---|
| CN | 1948778 A | 4/2007 |
| CN | 101163904 A | 4/2008 |
| CN | 202441770 U | 9/2012 |
| CN | 104246278 A | 12/2014 |
| DE | 44 16 175 A1 | 11/1995 |
| DE | 44 30 258 C1 | 1/1996 |
| DE | 94 22 342 U1 | 4/2000 |
| DE | 101 39 902 A1 | 9/2002 |
| DE | 102 19 148 C1 | 9/2003 |
| DE | 102 42 397 B3 | 3/2004 |
| DE | 10 2004 058 433 A1 | 6/2006 |
| DE | 10 2012 008 573 A1 | 10/2013 |
| DE | 10 2012 103 017 A1 | 10/2013 |
| DE | 10 2012 012 816 A1 | 1/2014 |
| EP | 0 684 403 B1 | 9/2000 |
| EP | 1 819 936 B1 | 10/2009 |
| EP | 2 647 865 A2 | 10/2013 |
| EP | 2 679 854 B1 | 11/2016 |
| RU | 2 265 144 C1 | 11/2005 |
| RU | 2 328 635 C2 | 1/2006 |
| WO | WO 96/12900 A1 | 5/1996 |
| WO | WO 2013/143988 A1 | 10/2013 |
| WO | WO 2013/180557 A1 | 12/2013 |
| WO | WO 2013/180558 A1 | 12/2013 |

OTHER PUBLICATIONS

Japanese-language Office Action issued in counterpart Japanese Application No. 2018-529742 dated Jun. 3, 2019 with unverified English translation (16 pages).
Russian-language Search Report issued in counterpart Russian Application No. 2018111261/11(017505) dated Dec. 28, 2018 with English translation (14 pages).
International Search Report (PCT/ISA/210) issued in PCT Application No. PCT/EP216/070560 dated Feb. 10, 2017 with English translation (Eight (8) pages).
German-language Written Opinion (PCT/ISA/210) issued in PCT Application No. PCT/EP216/070560 dated Feb. 10, 2017 with English translation (Ten (10) pages).
German-language Office Action issued in counterpart German Application No. 10 2015 114 546.4 dated Apr. 13, 2016 (Eight (8) pages).
Hindi-language Office Action issued in counterpart Indian Application No. 201837007091 dated Jan. 28, 2020 with English translation (six (6) pages).

* cited by examiner

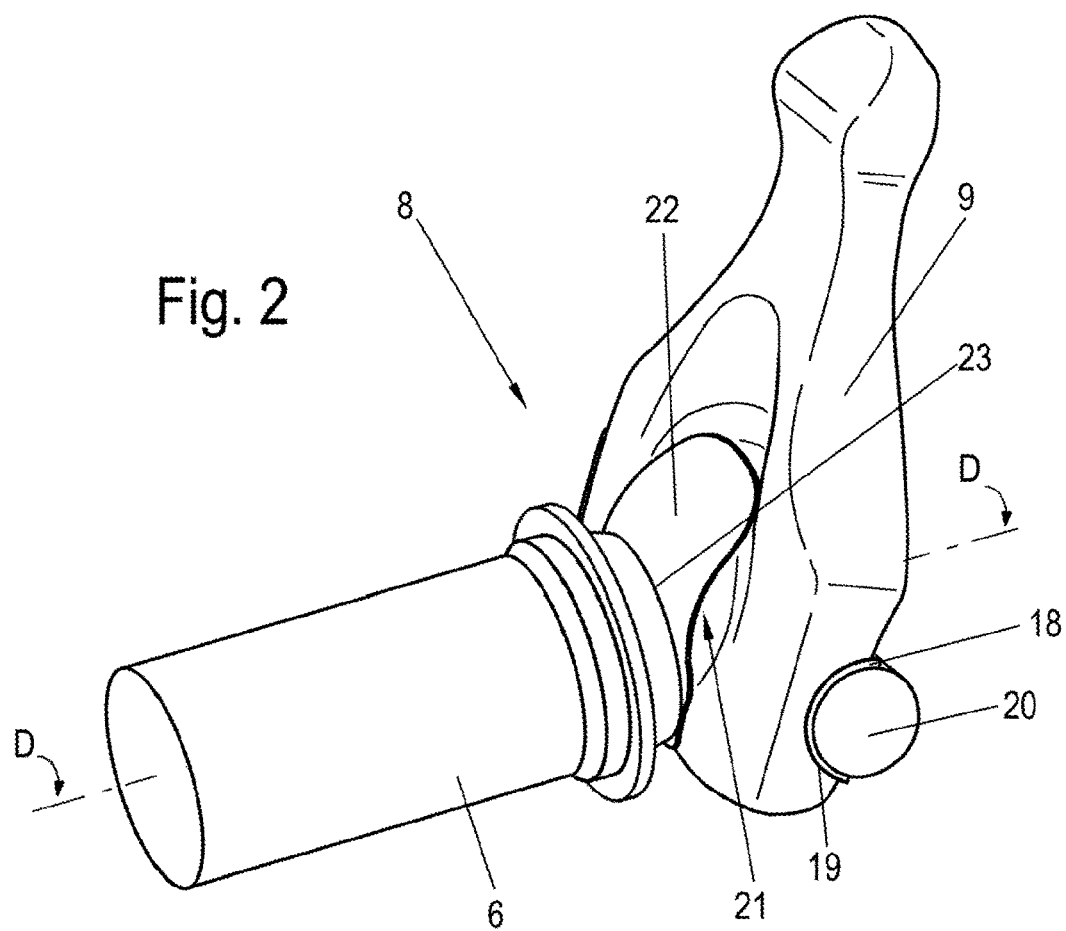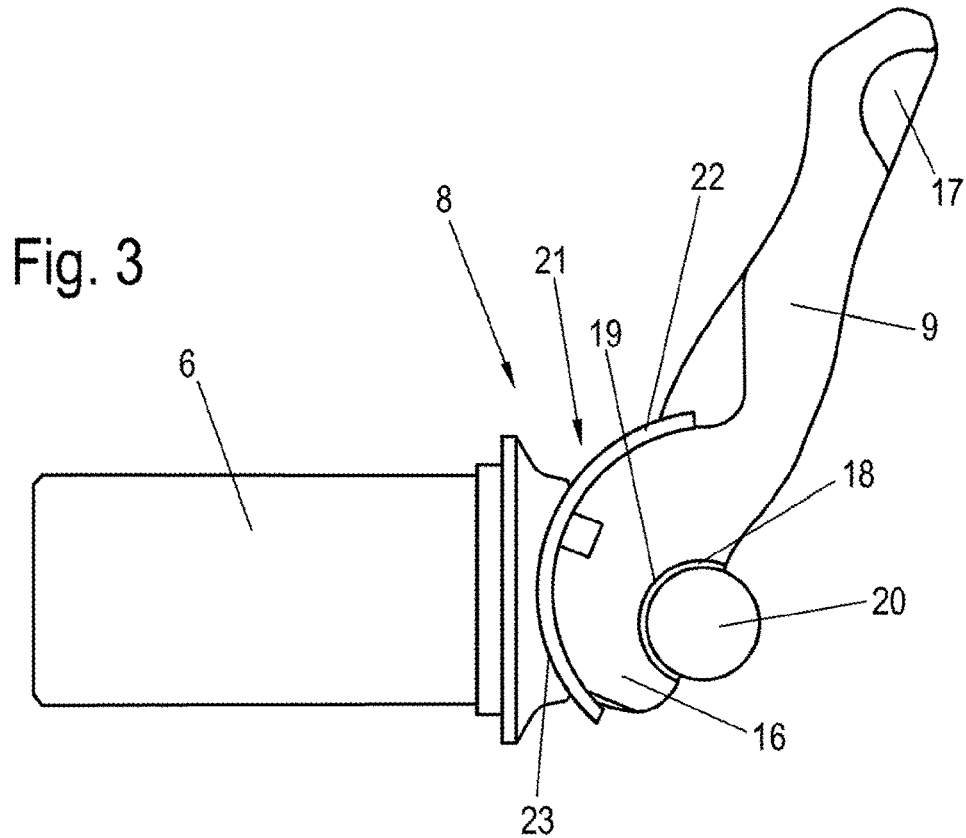

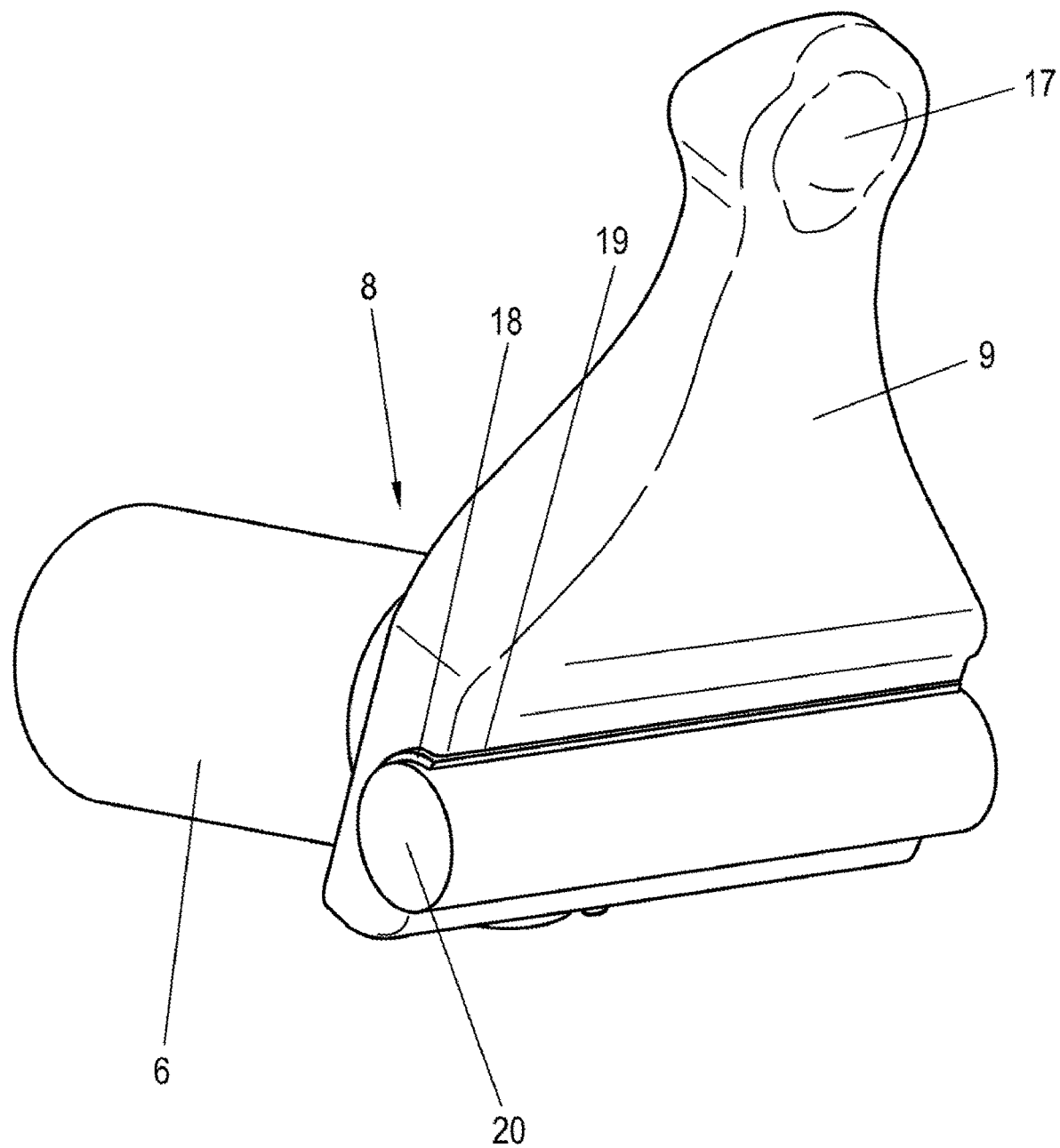

DISC BRAKE FOR A VEHICLE, PARTICULARLY FOR A COMMERCIAL VEHICLE

CROSS REFERENCE TO RELATED APPLICATIONS

This application is a continuation of PCT International Application No. PCT/EP2016/070560, filed Sep. 1, 2016, which claims priority under 35 U.S.C. § 119 from German Patent Application No. 10 2015 114 546.4, filed Sep. 1, 2015, the entire disclosures of which are herein expressly incorporated by reference.

BACKGROUND AND SUMMARY OF THE INVENTION

The invention relates to a disc brake for a commercial vehicle having a brake caliper which is configured to straddle a brake disc and in which a brake application device is arranged, a single-piece rotary lever which has an eccentric, and at least one brake plunger which is configured as a threaded spindle arrangement with a rotational axis, and by way of which at least one brake pad can be pressed against the brake disc upon actuation of the rotary lever. The rotary lever is arranged in the brake caliper so as to be pivoted relative to the latter, and is supported on the brake caliper in at least one supporting region directly or via one or more elements which are connected in between.

A very wide variety of designs of disc brakes of this type are known. Reference is to be made by way of example to DE 94 22 342 U1, in which a brake application device is disclosed which is provided with a rotary lever which can be pivoted during a braking operation and is configured as an eccentric at one end.

Here, the eccentric bears on one side against the inner wall of the caliper head of the brake caliper and on the other side via an anti-friction roller against a bridge, in which two brake plungers, which are configured as threaded spindles, are mounted rotatably. In the case of a braking operation, that is to say in the case of pivoting of the rotary lever, said brake plungers can be pressed against an associated brake pad (of preferably two brake pads on both sides of the brake disc) which is then in turn pressed against the vehicle-side brake disc.

Anti-friction bearings are provided for mounting the rotary lever on the caliper head, usually in the form of needle bearings which are held in specially designed bearing shells. The mounting of the rotary lever on the bridge by way of the above-mentioned anti-friction roller takes place with the provision of what is known as a DU bearing as a bearing shell which lies in a channel-shaped recess of the bridge and/or the rotary lever.

DE 10 2004 058 433 A1 discloses a disc brake which corresponds in structural terms to the above-mentioned disc brake, the rotary lever having, instead of a separate anti-friction roller, an integrally formed anti-friction roller which bears directly against the bridge.

In another comparable construction which is disclosed in WO 96/12900 A1, the rotary lever is supported via an anti-friction roller on the caliper head, whereas the anti-friction bearings are positioned on the bridge.

DE 44 16 175 A1 discloses a disc brake, in which the eccentric section of the rotary lever bears against the bridge, which supports a brake plunger. Here, said bridge has an adapted concavely configured channel for receiving the convexly curved eccentric section.

A further embodiment of a disc brake can be gathered from DE 101 39 902 A1. It is proposed in said document to allow the rotary lever to act directly on the brake plungers, to which end a ball is mounted between the rotary lever and a threaded spindle of the brake plunger. The rotary lever itself is likewise supported pivotably on the caliper head via balls. Another design variant of said disc brake provides the use of intermediate pieces which have spherically shaped ends which are inserted into recesses of the rotary lever which are adapted to them, the respective intermediate piece being functionally connected as a constituent part of the brake plunger to the respectively associated threaded spindle.

DE 10 2012 008 573 A1 and DE 10 2012 012 816 A1 have in each case disclosed a disc brake, in which the rotary lever is likewise supported by way of balls on a brake plunger on one side and on the brake caliper on the other side. Here, however, merely a central brake plunger is provided for applying the disc brake, having a rotatable actuating spindle and a sleeve which is guided thereon and has an internal thread which engages into an external thread of the actuating spindle. The sleeve supports, on its side which faces away from the rotary lever and faces the brake pad, a pressure piece which makes contact with the associated brake pad and is configured as a pressure plate.

In order to position the balls on the brake caliper, that is to say on the caliper back, bearing blocks are integrally formed onto the brake caliper, which bearing blocks have a recess which is adapted to the balls on the end side in order to receive said balls.

The necessary machining of the bearing blocks is problematic here, to which end a correspondingly long and consequently unstable tool has to be introduced through an assembly opening of the brake caliper. Considerable manufacturing complexity is associated with this, both in the case of the machining itself and in the case of a check of the machining which comprises the dimensional conditions and the surface quality. This is naturally possible only with considerable manufacturing complexity and therefore cost outlay.

An adjusting device which can be actuated by the rotary lever is arranged next to the brake plunger and is provided with a gearwheel which meshes with a gearwheel which is held fixedly on the actuating spindle so as to rotate with it. The result is that the actuating spindle rotates, driven by way of the adjusting device, and displaces the sleeve with the pressure piece axially in the direction of the associated brake pad in order to adjust an air gap which has changed owing to the wear.

Both DE 10 2012 103 017 A1 and WO 2013/180557 A1 in each case disclose and describe a brake application device of a disc brake, in which brake application device, in a manner which differs from those described above, the adjustment for air play compensation does not take place by way of a rotation of the brake plunger, but rather by way of a threaded screw which is guided in the bridge and in the case of the rotation of which the bridge is adjusted correspondingly.

In DE 10 2012 103 017 A1, the rotary lever bears with a convex eccentric section via anti-friction bearings against pressure pieces which correspond with the bridge.

In the arrangement according to WO 2013/180557 A1, in a manner which differs from this, the rotary lever bears against anti-friction rollers which lie on the other side in a channel-shaped receptacle of the stationary brake plungers.

In the case of the known disc brakes, the number of components of the brake application device can be optimized, which components can be provided only with a correspondingly high manufacturing complexity and, moreover, cause considerable assembly costs, since all the involved components have to be installed with an accurate fit and function. Moreover, special structural measures are required in order for it to be possible, in particular, to absorb lateral forces which act on the bridge which receives the threaded spindles.

Against this background, the invention is based on the object of developing a disc brake of the generic type in such a way that it can be manufactured and assembled in a simpler and less expensive way and its operational reliability is improved.

This object is achieved by way of a disc brake for a vehicle, in particular for a commercial vehicle, having a brake caliper which is configured to straddle a brake disc and in which a brake application device is arranged, and having a rotary lever which has an eccentric and at least one brake plunger which is configured as a threaded spindle arrangement with a rotational axis, and by way of which at least one brake pad can be pressed against the brake disc upon actuation of the rotary lever. The rotary lever is arranged in the brake caliper so as to be pivoted relative to the latter, and is supported on the brake caliper in at least one supporting region directly or via one or more elements which are connected in between. The rotary lever which can be pivoted with respect to the brake plunger has at least one convexly shaped section on its side which lies opposite the supporting point on the brake caliper, which convexly shaped section bears against the threaded spindle arrangement on a concave end side which is adapted to it, in an axial extension preferably of the rotational axis of said threaded spindle arrangement.

The use of relatively expensive anti-friction bearings can in principle be dispensed with (although this is also possible as an alternative) as a result of said structural configuration firstly of the rotary lever and secondly of the brake plunger. Instead, the use of one or more plain bearings in the form of (plain) bearing shells on the eccentric of the rotary lever is possible and preferred, which (plain) bearing shells are as a rule less expensive than comparable anti-friction bearings.

Here, the construction according to the invention can be realized both in the case of a disc brake with merely one brake plunger and in the case of a disc brake of the described type with two brake plungers. In the latter case, the rotary lever is preferably provided with one or even two of the convex points.

For the case where a bridge is used, as it were, as a support for the turned parts of the threaded spindle arrangement, the rotary lever then no longer bears against the bridge directly or with an anti-friction roller joined in between, but rather bears against an end side of the threaded spindle arrangement which forms the brake plunger. Depending on the design variant, the screw of the threaded spindle arrangement can be capable of being rotated, in order, in interaction with an adjusting device, to compensate for a wear-induced change in the air play, that is to say the spacing between the associated brake pad and the brake disc.

A section which is concavely shaped in a manner which corresponds to the convex section of the rotary lever can preferably be provided on the end side of the threaded spindle arrangement. This can preferably be configured in a simple and inexpensive manner as a spherical section-shaped depression, whereas the associated section of the rotary lever which bears against it is adapted to it, as it were, as a counterpart in the form of a spherical section which can likewise be manufactured inexpensively.

Here, the pairing of the convex section of the rotary lever/concave depression of the threaded spindle arrangement forms a rotary bearing during the rotation of the screw.

In one design variant, in which the screw of the threaded spindle arrangement is held such that it cannot rotate and is in engagement with a threaded sleeve which can be rotated with respect to it as a constituent part of the brake plunger, the end-side concave curve which faces the rotary lever can have the contour of a cylinder cutout, the curvature running in the pivoting direction. In a manner which is adapted to it, the convex curve of the rotary lever is in a section which bears against the end side of the nut or the threaded sleeve, the curvature of said section extending over the entire pivoting range of the rotary lever.

It is provided according to a further aspect of the invention to provide the shaped section of the rotary lever and/or the correspondingly shaped end side of the brake plunger with a bearing shell, preferably as a plain bearing shell, in particular as a composite bearing shell made from metal/plastic, in order to minimize the friction during pivoting of the rotary lever. In this case, the convexly shaped section bears indirectly against the threaded spindle arrangement or the brake plunger.

The anti-friction roller which is of cylindrical configuration and is supported on the opposite side on the caliper head is likewise enclosed in regions by a bearing shell which lines a correspondingly configured bearing channel of the brake caliper and/or a bearing channel of the rotary lever, in which the anti-friction roller lies.

In this configuration, the rotary lever and the anti-friction roller are manufactured as separate parts. It is also contemplated, however, to configure the anti-friction roller and the rotary lever in one piece.

The mounting of the rotary lever on the caliper head preferably takes place via balls which, according to one preferred refinement of the invention, are mounted in separate bearing blocks which are fastened in the caliper head.

In the case of the arrangement of two bearing points, that is to say two bearing blocks, which in each case have a recess which is adapted to the balls for receiving the latter, one of the bearing blocks is not connected rigidly to the caliper head, but rather in a floating manner as it were, with the result that manufacturing-induced tolerances of the bearing are compensated for.

In a manner which is optimized in terms of manufacturing technology, the bearing blocks are configured as turned parts, in each case with a supporting pin, in which the ball lies, and a journal which is recessed with respect thereto and is plugged into an adapted bore of the caliper head.

In order to achieve an exactly axial orientation of the respective bearing block, the step face between the supporting pin and the journal is of planar configuration, as is a bearing face of the caliper head, against which bearing face the step face bears.

The configuration as a turned part of the respective bearing block proves particularly advantageous, in particular, with regard to manufacturing technology, it also being possible for the bearing face of the caliper head to be manufactured with low production complexity.

The rigid fastening of the one bearing block to the caliper head can take place in a frictionally locking manner, the pairing of the caliper head bore/journal being configured in the sense of a press fit. It is also contemplated, even if it is more complex in terms of manufacturing technology, however, to provide the journal with an external thread and the bore of the caliper head with an internal thread.

Instead of as turned parts, the bearing blocks can also be manufactured by way of a cold pressing process, with the result that additional machining operations, in particular with the removal of material, are not necessary, which results in particularly inexpensive manufacture.

If required, floating mounting of the two bearing blocks is also possible instead of the floating mounting of one bearing block.

It can be provided, furthermore, to arrange a plain bearing shell between the balls and the rotary lever, in particular in the form of a composite plain bearing which consists of metal and a plastic layer which is connected thereto.

In principle, the convexly shaped section of the rotary lever and the end side of the brake plunger which is adapted thereto can be used without further machining. Here, the configuration of the rotary lever and, above all, that of the shaped section are produced by way of forming, for example by way of forging or wobbling. The surfaces which bear against one another can also be reworked for special surface requirements.

As has been shown, the refinement of the convexly shaped section of the rotary lever and/or the concave end side of the threaded spindle arrangement which bears against it afford/ affords special functional advantages if said bearing faces are subjected to precision machining, in order thus to achieve as low a roughness as possible. This includes, for example, machining by way of vibratory grinding, lapping, polishing, honing, eroding or rolling; said machining options which are mentioned are to be considered to be by way of example. The aim is as low a roughness value as possible which can be achieved in an economically appropriate way, in accordance with what is required for a series product such as a disc brake.

In summary, the invention is distinguished by less expensive manufacture and a smaller assembly complexity, in particular since the brake application device overall can then be realized with fewer components.

The operational reliability of the disc brake is also improved by way of the invention, since lateral forces which act on the lever bearing during operation are largely prevented.

It is simple and inexpensive if the at least one convexly shaped section is of elliptical, spherical segment-shaped or barrel section-shaped configuration.

In the case of the invention being realized on a disc brake having a centrally arranged threaded spindle arrangement, as known from DE 10 2012 008 573 A1 which was cited in respect of the prior art, the concave shaping of the end side, which faces the rotary lever, of the threaded spindle arrangement which has a gearwheel which is connected fixedly to the screw so as to rotate with it and is in engagement with a gearwheel of the adjuster can be made directly in the screw, against which the convex section of the rotary lever bears, directly or indirectly via a bearing shell which is mounted in between, for example. It is also contemplated, however, to provide the concave shaping in a formed attachment of the gearwheel, which attachment is in engagement with the screw.

Instead of a gearwheel drive for adjusting the threaded spindle arrangement, other gear arrangements are also possible, for example a flexible drive.

In the case of a braking operation, that is to say upon actuation of the rotary lever, the threaded spindle arrangement is displaced axially in the direction of the brake pad, including the gearwheel which is held fixedly on the screw so as to rotate with it and, as has been mentioned, is in engagement with the gearwheel of the adjuster which, however, is positioned in an axially fixed manner to this extent. That is to say, the two gearwheels which are in engagement perform a relative movement to one another in the axial direction which, however, leads to considerable mechanical loading, by way of which the service life of the brake system is impaired.

In order to remedy this, it is provided according to a further aspect of the invention to hold the involved gear mechanism wheels, such as chain sprockets or gearwheels, in the axial direction on a driver device which preferably consists of two plates which are arranged parallel to and at a spacing from one another, are preferably made from sheet metal, and between which the gearwheels, for example, are positioned. The two plates are connected to one another and are held at a spacing by way of suitable means such as beads, spacer sleeves or the like. Here, the gearwheel, for example, of the adjuster is held on the adjuster fixedly so as to rotate with it, but in an axially displaceable manner, with the result that said gearwheel also performs the axial movement of the gearwheel of the threaded spindle arrangement during braking and also during restoring.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a brake application device according to an embodiment of the invention in a perspective view.

FIG. 3 shows one exemplary embodiment of the brake application device in a sectioned side view.

FIG. 4 shows a detail of the brake application device according to FIG. 3 in a rear-side perspective view.

DETAILED DESCRIPTION OF THE DRAWINGS

Figure 1:
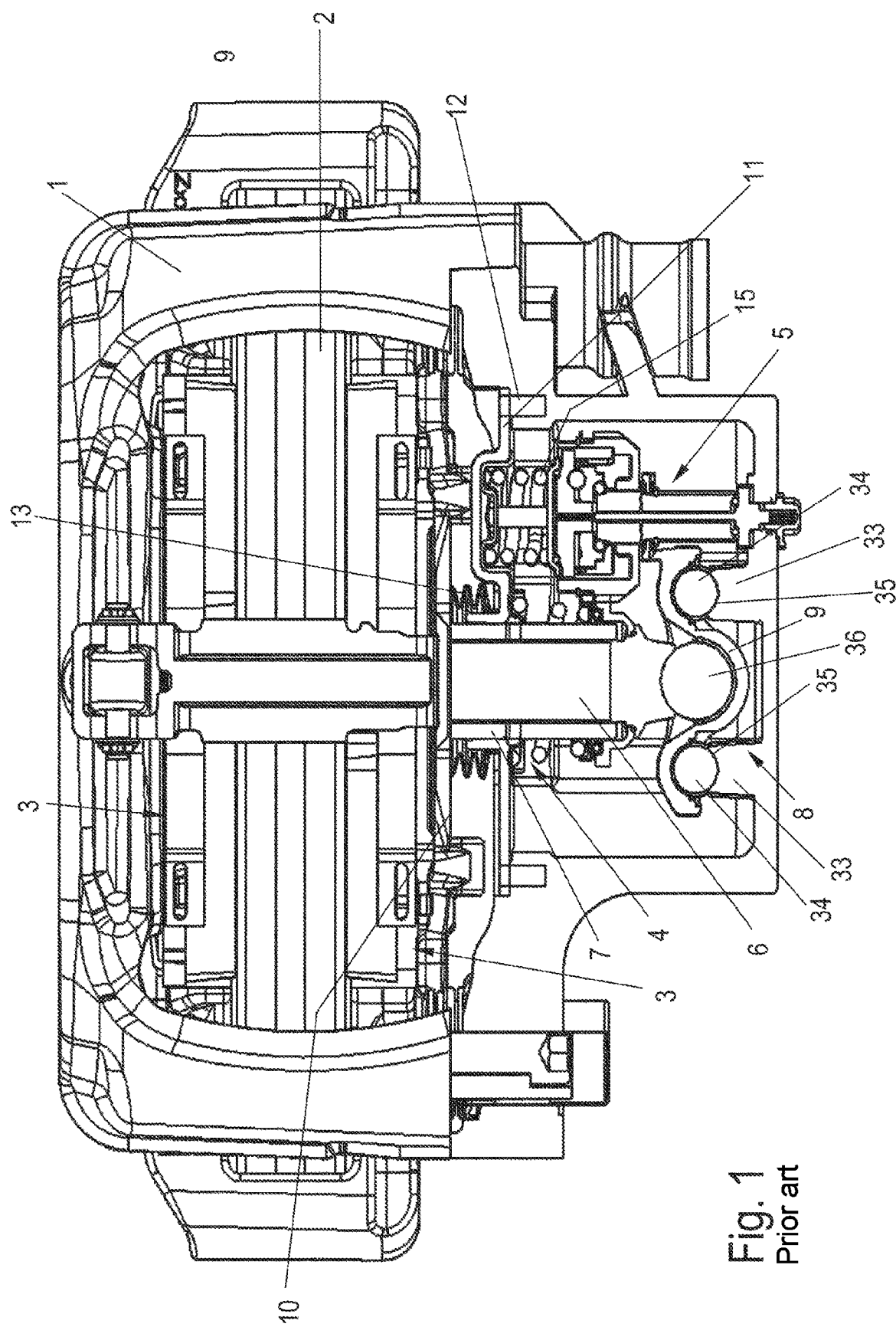
FIG. 1 shows a disc brake according to the prior art in a partially sectioned plan view.

FIG. 1 shows a diagrammatic view of a disc brake according to the prior art, having a brake caliper 1 which straddles a brake disc 2, is configured as a sliding caliper, and in which two brake pads 3 are arranged which are pressed against the brake disc 2 during operation, that is to say in the case of a braking operation.

Here, first of all, the brake application-side brake pad 3 is pressed against the brake disc 2 by means of a brake application device 8, whereas subsequently, on account of the reaction forces, the reaction-side brake pad 3 is pressed against the brake disc 2 by way of driving of the brake caliper 1 which is displaced.

The brake application device has a central threaded spindle arrangement 4 which can be pressed against the brake application-side brake pad 3 in an axially displaceable manner via a rotary lever 9.

The threaded spindle arrangement 4 consists of a rotatable screw 6 and a threaded sleeve 7 which is held such that it cannot rotate with respect to said screw 6. The internal thread of the threaded sleeve 7 engages into the external thread of the screw 6. On the side which faces the action-side brake pad 3, a plate-shaped pressure piece 10 which bears against the brake pad 3 in the case of braking is connected on the threaded sleeve 7.

An adjuster 5 is connected to the screw 6 for compensating for an air play which changes in a wear-induced manner, that is to say the spacing between the brake pad 3 and the brake disc 2.

In order to protect a receiving chamber of the brake caliper 1, which receiving chamber receives the brake application device 8 and the adjuster 5, an assembly opening of the brake caliper 1 is closed on that side which faces the brake disc 2 by way of a closure plate 11 which is connected to the brake caliper 1 by way of screws 12.

The threaded spindle arrangement 4 passes through the closure plate 11, whereas the adjuster 5 is supported on the closure plate 11 in a manner which is loaded by way of a compression spring 15.

The passage region of the threaded spindle arrangement 4 is sealed by way of a bellows 13 which bears sealingly on one side against the closure plate 11 and on the other side against the pressure piece 10 or against the threaded spindle arrangement 4.

The rotary lever 9 bears pivotably against the threaded spindle arrangement 4 via a ball 36 as an intermediate element, just like it is supported via balls 34 on the brake caliper 1. To this end, on that side of the rotary lever 9 which faces away from the threaded spindle arrangement 4 and forms a caliper head, the brake caliper 1 has two formed bearing blocks 33 which are arranged parallel to and at a spacing from one another, protrude into a receiving space of the brake caliper 1, and have a recess 35 which is adapted to the ball 34 which lies in it in order to receive the balls 34 on the side of said bearing blocks 33 which faces the rotary lever 9.

FIGS. 2-4 depict a part of the brake application device 8. The rotary lever 9, which is manufactured in one piece preferably by way of forging, tumbling or a comparable forming process, is configured as an eccentric 16 (or as an eccentric section) at its one end, whereas a coupling, in particular in the form of a depression 17, is preferably provided at the other end of the rotary lever 9. A tappet of a brake cylinder engages or can engage into the coupling 17, which tappet can in turn be actuated, for example, pneumatically and/or by electric motor.

As can be seen, in particular, in FIGS. 2 and 3, the eccentric 16 of the rotary lever 9 lies directly in an axial extension of the threaded spindle arrangement 4, of which merely the screw 6 is depicted here, in particular in an axial extension of a rotational axis D which corresponds to the rotational axis of the screwing movement between the threaded sleeve 7 and the screw 6.

On the opposite side of the eccentric 16, a channel 19 is configured in the eccentric 16 of the rotary lever 9, in which channel 19 a bearing device, in particular a (plain) bearing shell 18, is arranged in the example.

A cylindrical anti-friction roller 20 lies in the bearing device, in the bearing shell 18 in the example, which cylindrical anti-friction roller 20 is supported at a supporting point which is provided on the caliper head of the brake caliper 1 and can be a bearing point. Here, the anti-friction roller 20 preferably configures a pivoting bearing for the rotary lever 9, which can be seen particularly clearly in FIG. 4.

According to the invention, on its side which lies opposite the anti-friction roller 20 and forms the eccentric 16, the rotary lever 9 is provided with a convexly shaped section 21 which bears against a concave end side 23 of the screw 6, which end side 23 is adapted to said convexly shaped section 21. The curvature of the convexly shaped section 21 is preferably oriented in an opposed manner with respect to the curvature of the eccentric 16 of the rotary lever 9.

In the example according to FIGS. 2 and 3, the section 21 is configured as a section of a cylinder shell, the curvature of which extends in the pivoting direction of the rotary lever 9. Here, the section 21 is covered by way of a bearing shell 22, preferably as a composite bearing which is otherwise dimensioned in such a way that it bears against the concave end side 23 of the screw 6 during the entire pivoting travel of the rotary lever 9.

In another design variant, the convexly shaped section 21 of the rotary lever 9 is configured as a spherical section, whereas the end side 23 of the screw 6 is then designed as a dome, in which the section 21 or the bearing shell 22 lies.

Whereas merely one brake plunger, that is to say one screw 6, is shown in the example, it goes without saying that there is also the possibility to realize the invention in the case of two brake plungers or two threaded spindle arrangements 4 which are arranged parallel to and at a spacing from one another.

Figure 5:
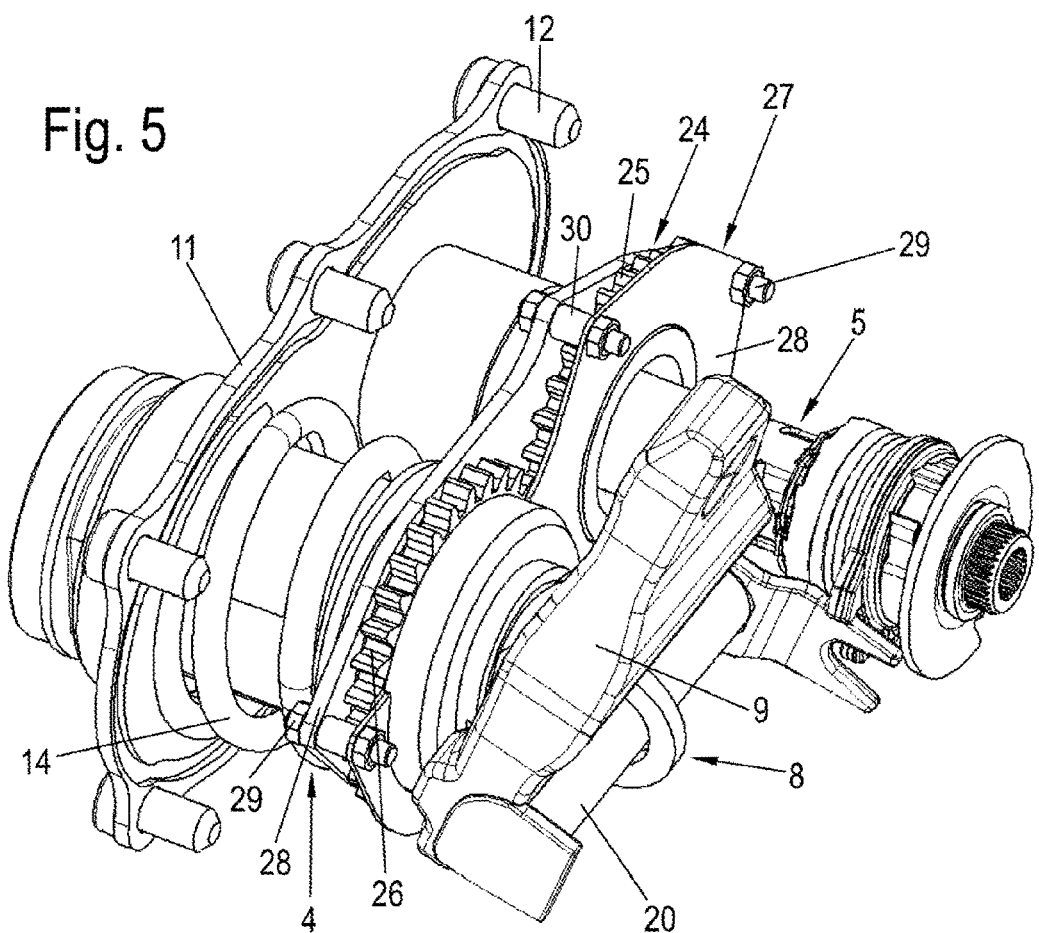
FIG. 5 shows a further exemplary embodiment of the brake application device in a diagrammatic perspective view.

FIG. 5 depicts a brake application device 8 as a detail, the functional configuration of which brake application device 8 corresponds to that in FIG. 1 which represents the prior art. That is to say, a central brake plunger is provided here in the form of a threaded spindle arrangement 4, having an adjuster 5 which is arranged adjacently with respect thereto and by way of which a gearwheel 25 of a gearwheel mechanism 24 can be driven, which gearwheel 25 is connected fixedly so as to rotate with it.

In order to transmit the rotational movement for the purpose of an air play compensation, the gearwheel 25 is in engagement with a gearwheel 26 which is connected fixedly to the screw 6 so as to rotate with it. The result is that the threaded sleeve 7 which is guided on the screw 6 is adjusted axially in the case of a rotation of the gearwheel 26 and therefore of said screw 6.

Figure 6:
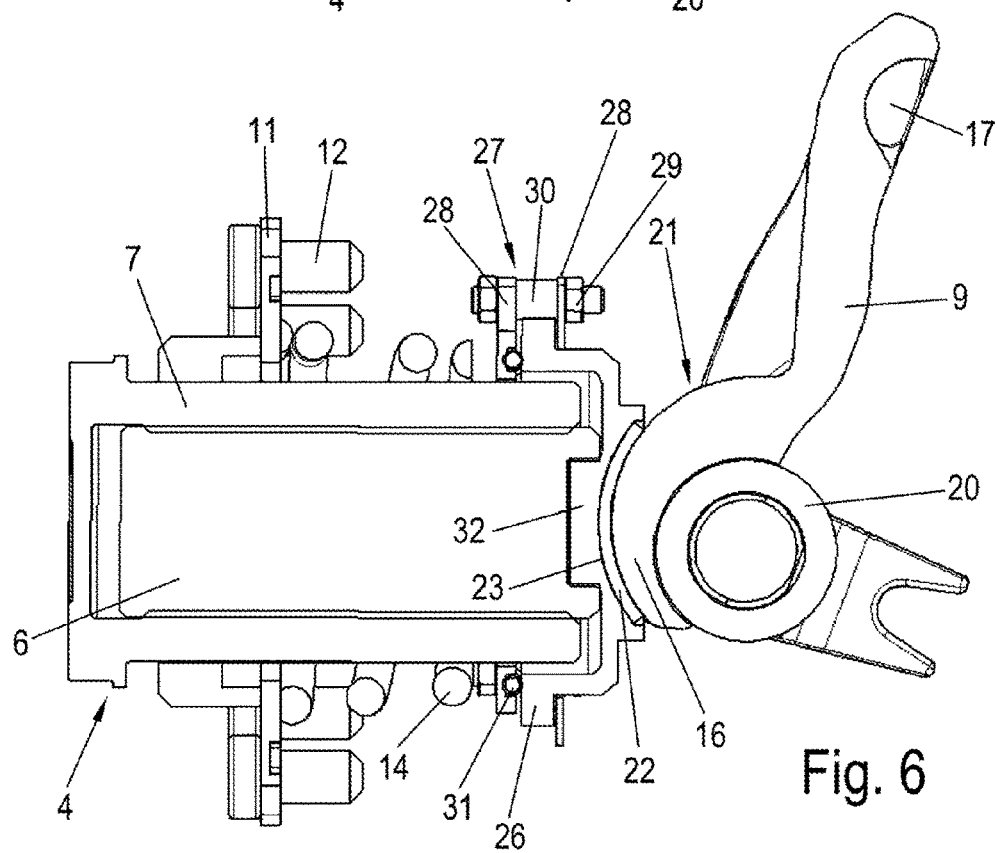
FIG. 6 shows the brake application device according to FIG. 5 in a diagrammatic sectioned side view.
Figure 8:
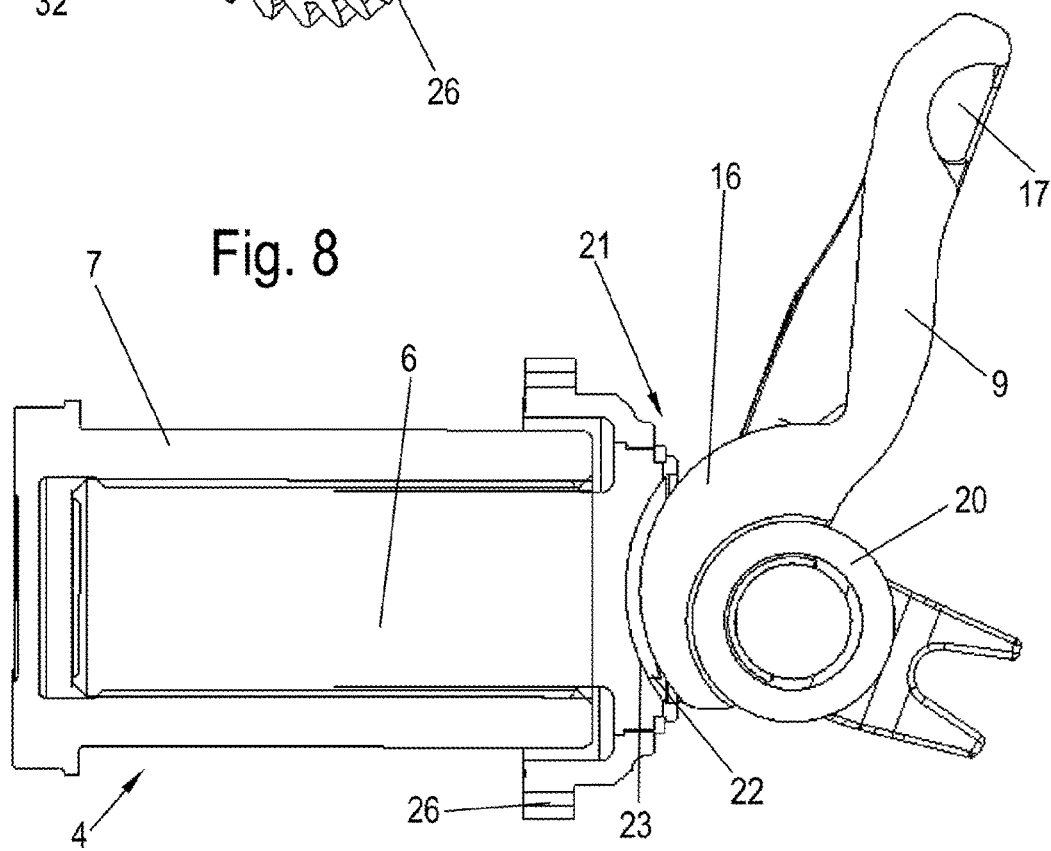
FIG. 8 shows the brake application device in a side view.

The arrangement of the gearwheel 26 can also be seen in FIGS. 6 and 8.

Figure 7:
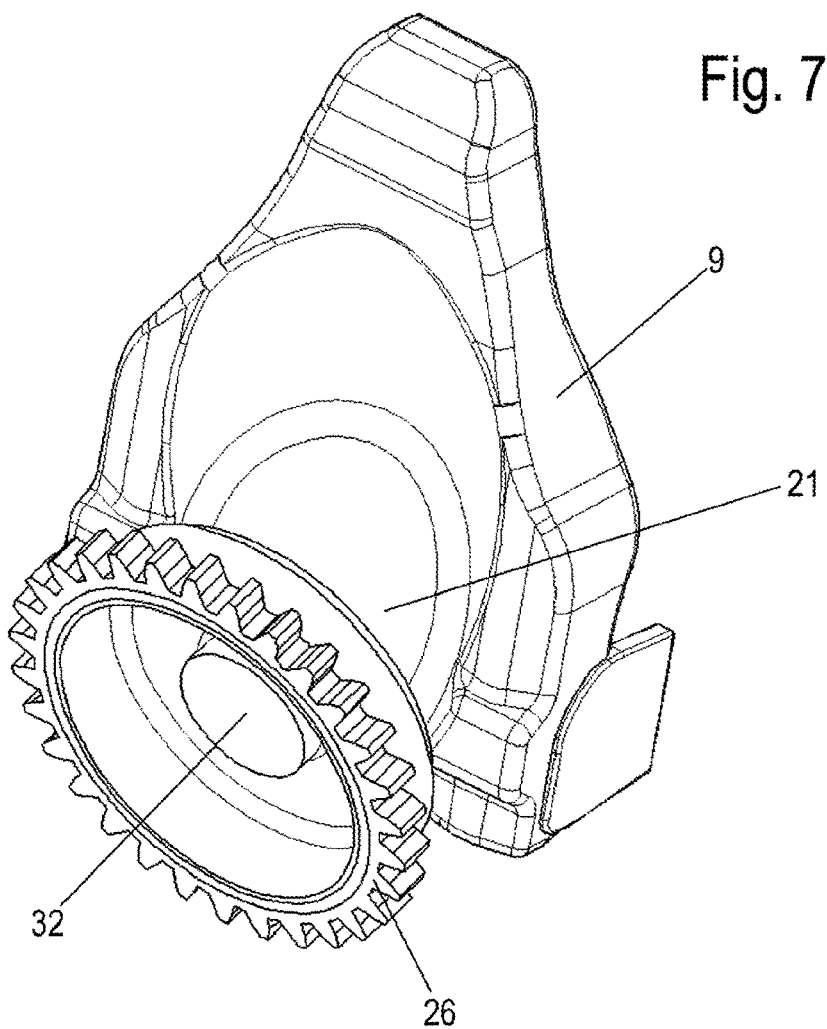
FIG. 7 shows a detail of the brake application device in a perspective front view.

In the example which is shown in FIG. 6, the convex section 21 of the rotary lever 9 is supported via the bearing shell 22 on an attachment 32 of the gearwheel 26, to which end the gearwheel 26 in the form of a spur gear has a bottom which is closed to this extent with the elevated attachment 32, which can be seen particularly clearly in FIG. 7, in which the rotary lever 9 and the gearwheel 26 are depicted in interaction in a perspective illustration.

In a deviation from this structural solution, FIG. 8 shows a variant, in which the convex section 21 of the rotary lever 9 bears against the facing end side of the screw 6, likewise with the bearing shell 22 being positioned in between, the end face 23 of the screw 6 being adapted to this end to the convex shape of the section 21.

It can be seen in FIGS. 5 and 6 that the two gearwheels 25, 26 of the gearwheel mechanism 24 are positioned in a driver device 27 which is formed from two plates 28 which are arranged parallel to and at a spacing from one another.

Said plates 28 in turn are connected to one another by way of screws 29, the spacing between the two plates 28 being formed by way of spacer sleeves 30 which are guided on the screws 29, as a result of which an intermediate space is provided for receiving the gearwheel mechanism 24. In order to form the intermediate space, at least one of the two plates 28, preferably both plates 28, can be provided with beads which protrude into the intermediate space and, for example, are welded to one another.

In the case of pivoting of the rotary lever 9 in order to apply the brake, the threaded spindle arrangement 4 is displaced axially in the direction of the brake pad 3 via the eccentric 16 (FIG. 1), with driving of the gearwheel 26. By means of the driver device 27, the gearwheel 25 of the adjuster 5 is at the same time also driven, to which end the gearwheel 25 is held on the adjuster 5 fixedly so as to rotate with it but in an axially displaceable manner. Since the gearwheels 25, 26 rotate with respect to the plates 28 during operation, sliding rings 31 are provided in order to reduce a frictional resistance between the gearwheels 25, 26 and the plates 28.

Otherwise, the restoring of the threaded spindle arrangement 4 and therefore also of the gearwheel 25 after the brake is released takes place by way of a compression spring 14 which is supported on one side on the closure cover 11 and on the other side on the associated plate 28 and is guided on the threaded spindle arrangement 4.

FIGS. 9-16 show a further design variant of the invention, in which the bearing blocks 33 which are arranged parallel to and at a spacing from one another are held as separate components in the brake caliper 1.

To this end, each bearing block 33 has a support pin 39 which is of conical configuration in the example and at the one end of which a journal 40 is formed which is plugged into a bore 41 of the brake caliper 1.

As has already been described with respect to the prior art, that end side of the support pin 39 which lies opposite the journal 40 is configured as a recess 35, in which the associated ball 34 lies.

Here, in order to receive the ball 34, the rotary lever 9 has a dome-like depression 37 which is lined by a plain bearing shell 38, it being possible for said plain bearing shell 38 to be configured as a composite plain bearing, with a carrier layer made from metal and a sliding layer made from plastic. As an alternative or in addition, the depression can also be covered by way of a plain bearing shell 38.

By way of a stepped supporting face 42 which is formed between the support pin 39 and the journal 40, the bearing block 33 bears against a face of the brake caliper 1, which face is adapted, for example is machined.

As has been mentioned, the connection between the bearing blocks 33 and the brake caliper 1 is configured in such a way that at least one bearing block 33 is configured in the sense of a floating bearing, with the option of compensating for manufacture-induced tolerances of the brake application device 8.

In this way, a dimensional redundancy of the bearing of the rotary lever 9 is avoided, which dimensional redundancy would arise if the two bearing blocks 33 were held rigidly on the brake caliper 1, as a result of which increased wear and a reduction in the service life are reduced considerably.

Figure 9:
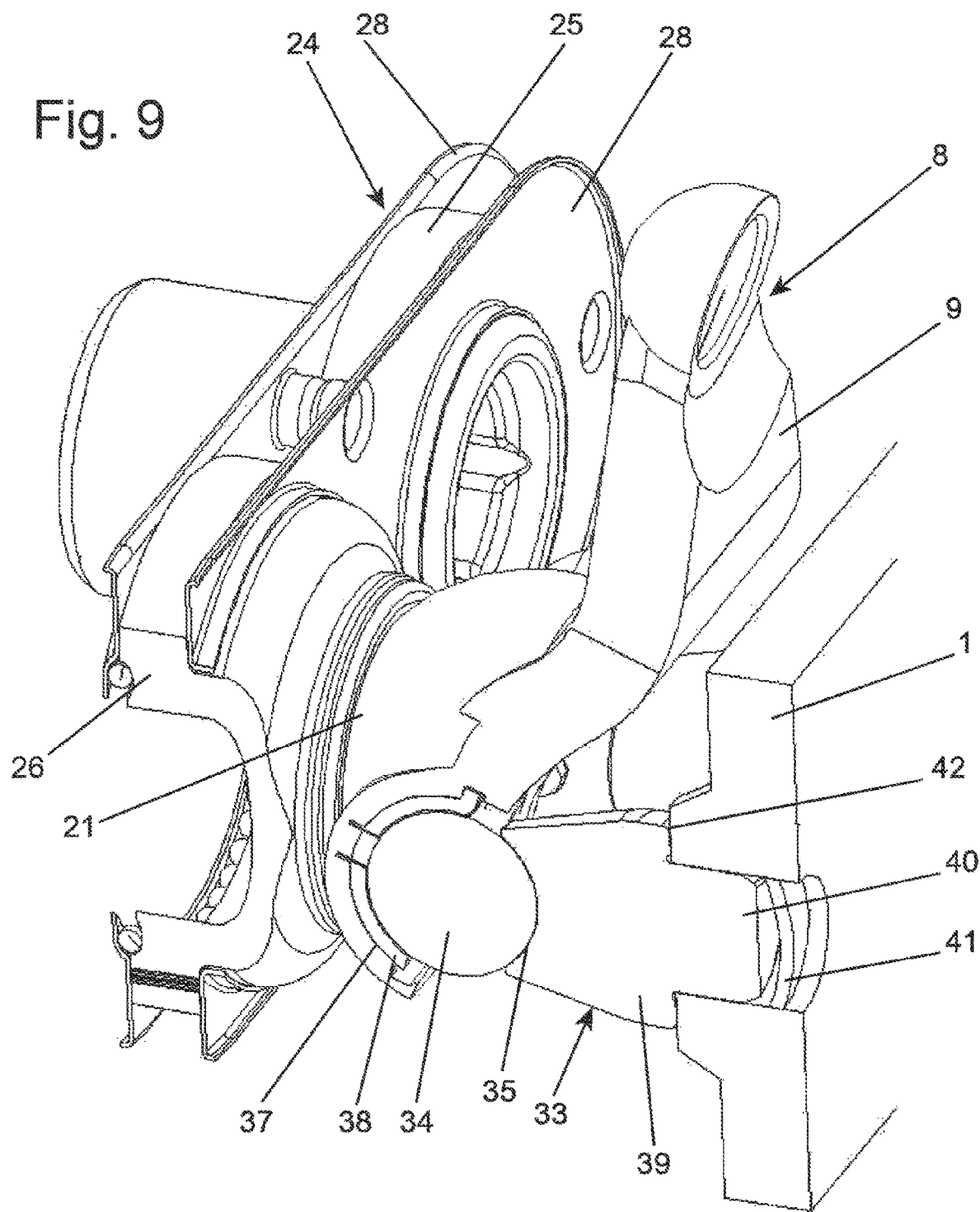
FIG. 9 shows a further exemplary embodiment of the invention in a sectioned, perspectively illustrated side view.
Figure 10:
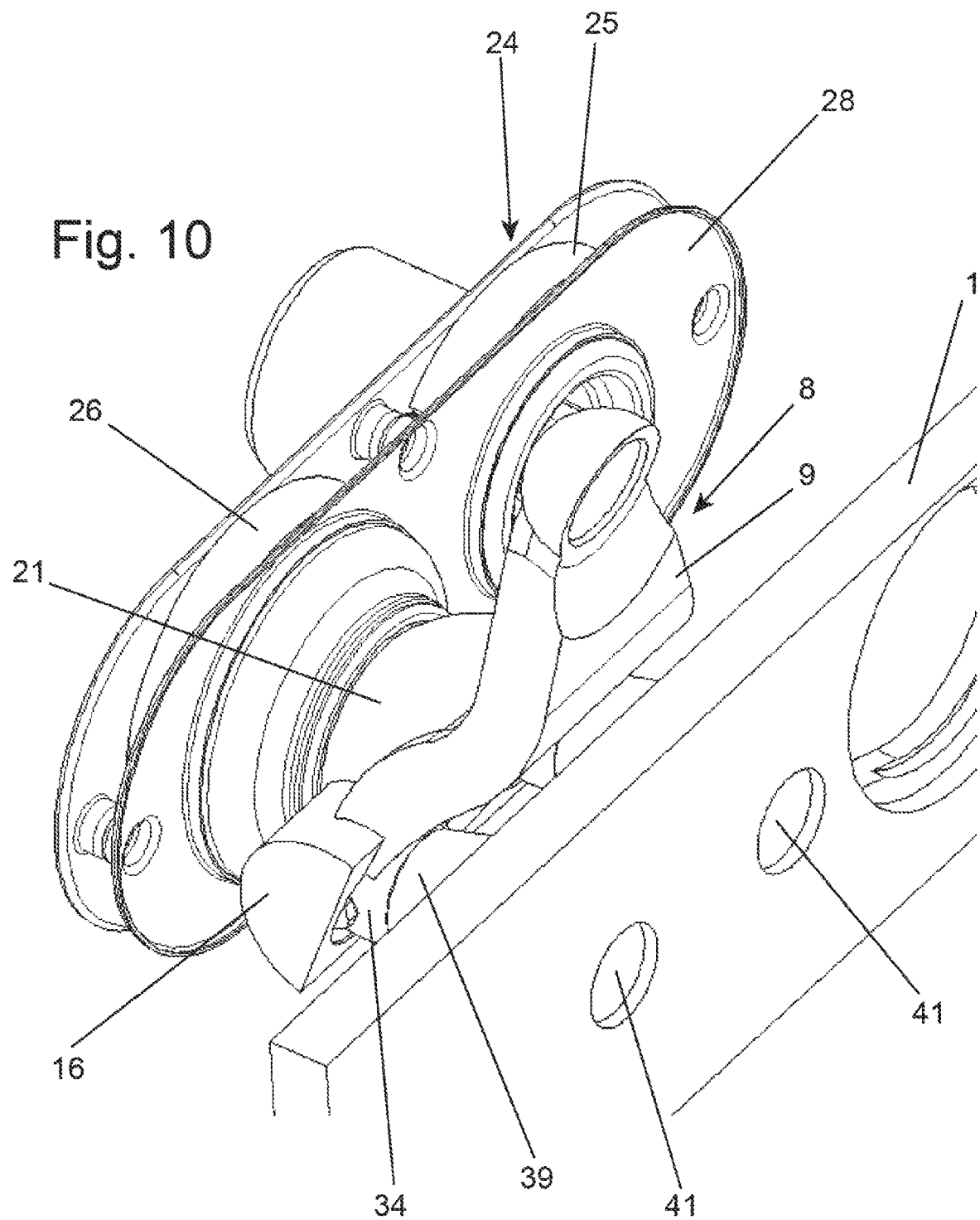
FIG. 10 shows a part view of FIG. 9, likewise in a perspective illustration.
Figure 11:
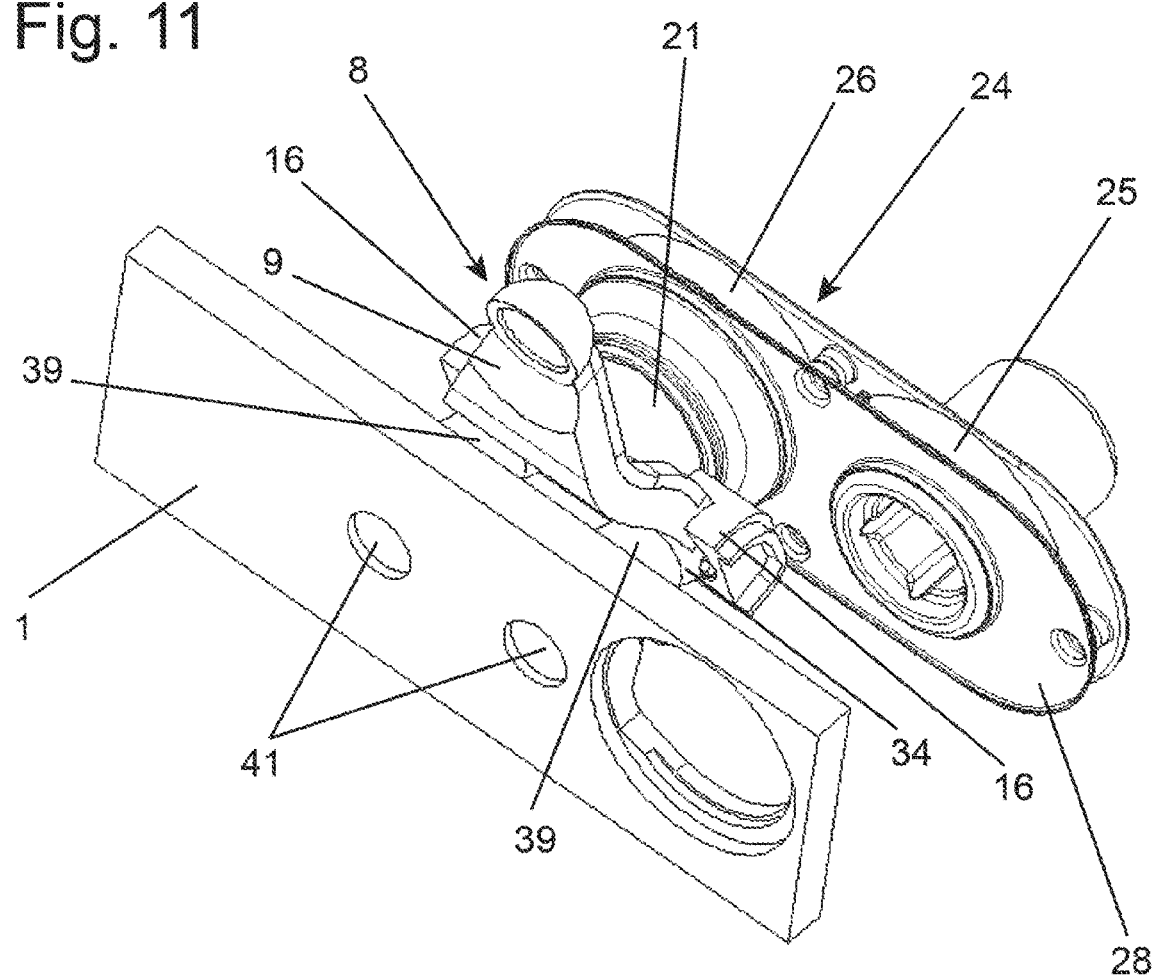
FIG. 11 shows the part view according to FIG. 10 in a tilted side view.

FIG. 9 depicts a sectioned side view of a part of a disc brake according to the invention. FIGS. 10 and 11 show different rear views of in each case the arrangement of the rotary lever 9 of the brake application device 8 and its mounting on the support pin 39 by way of the balls 34.

Figure 12:
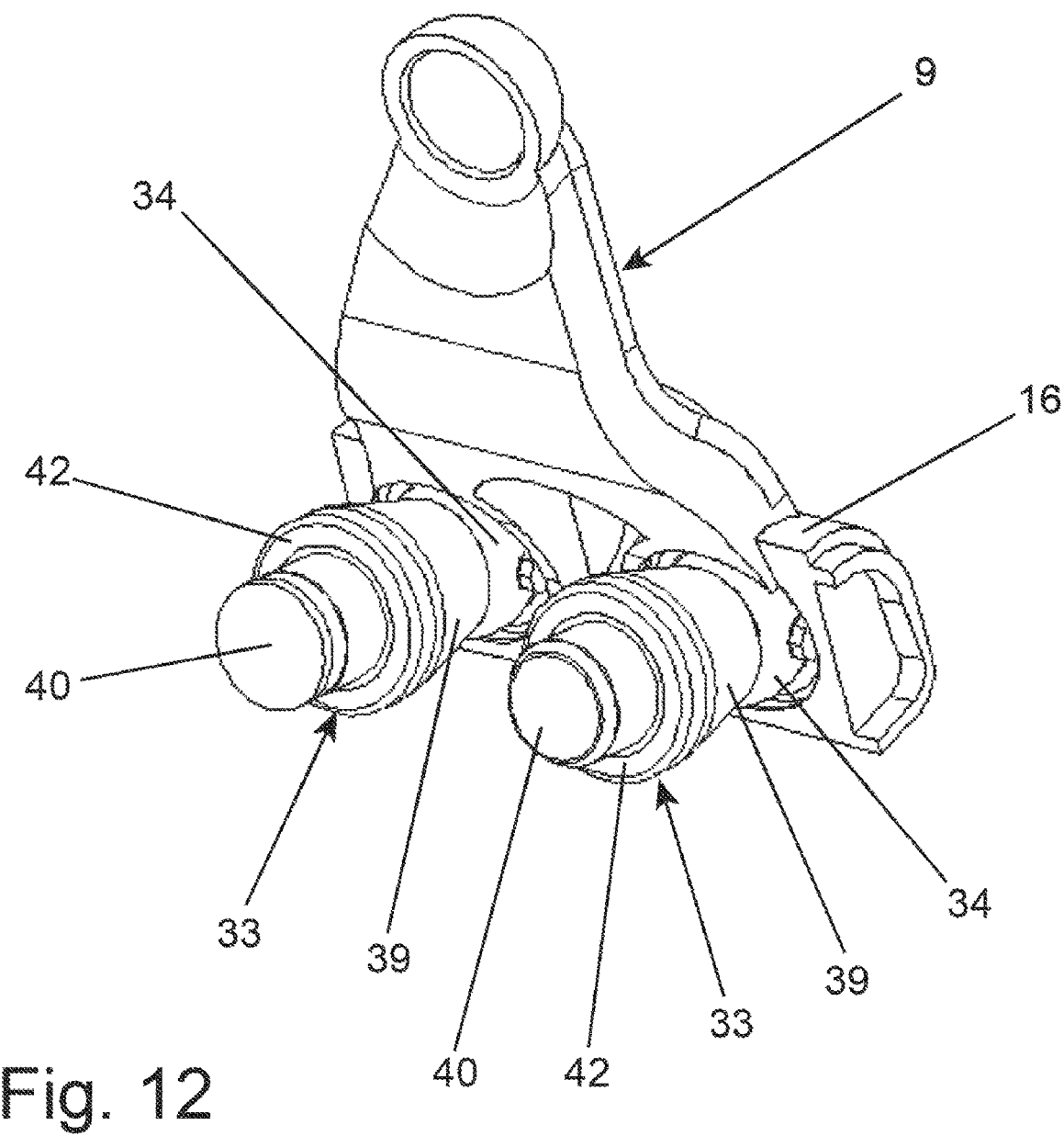
FIG. 12 shows a detail of the brake application device according to FIG. 9 in a perspective rear view.

FIG. 12 reproduces the rotary lever 9 with inset balls 34 on its own; the bearing blocks 33 can be seen as a detail.

Figure 13:
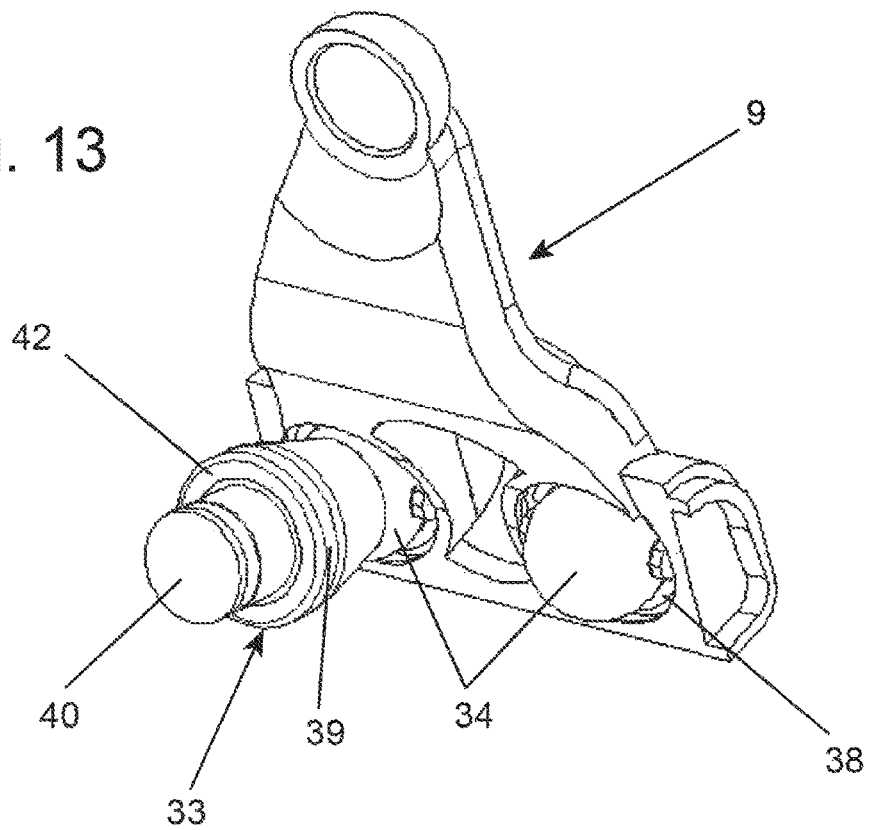
FIG. 13 shows a part view of the detail according to FIG. 12.

A comparable depiction can be seen in FIG. 13, it being possible here for a bearing block 33 to be seen on one side and the balls 34 without support in the support pin 39 on the other side.

Figure 14:
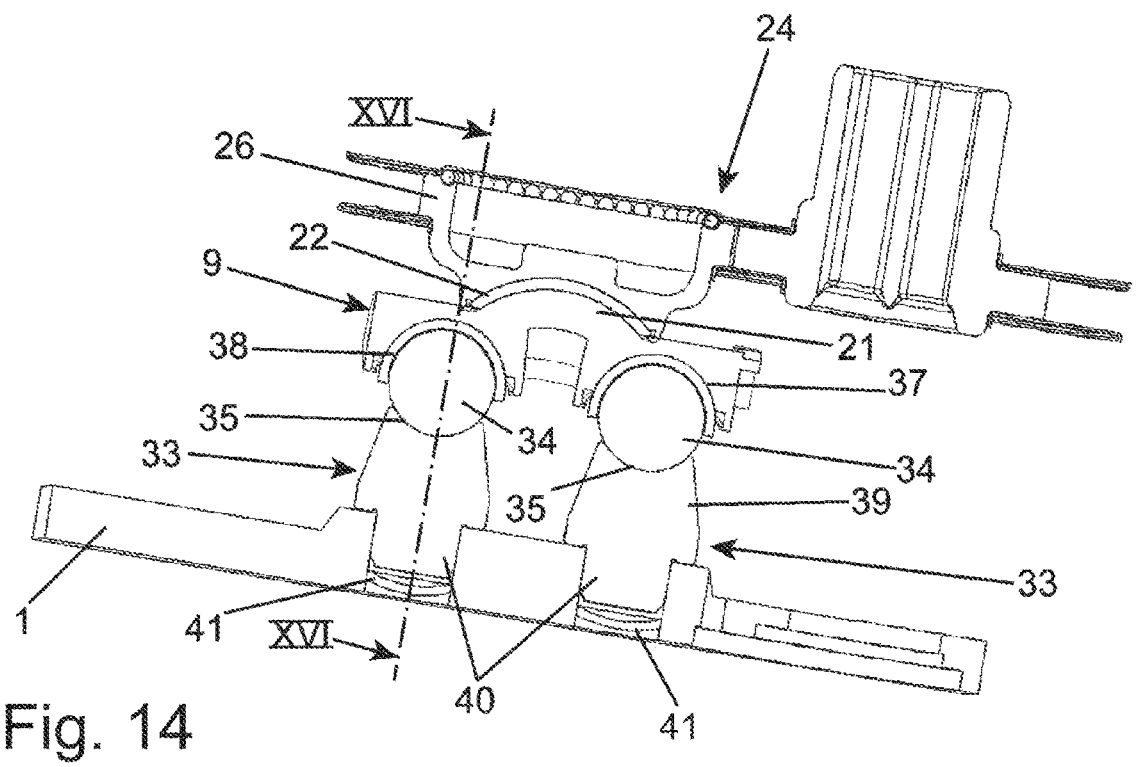
FIG. 14 shows the design variant according to FIG. 9 in a sectioned plan view.
Figure 15:
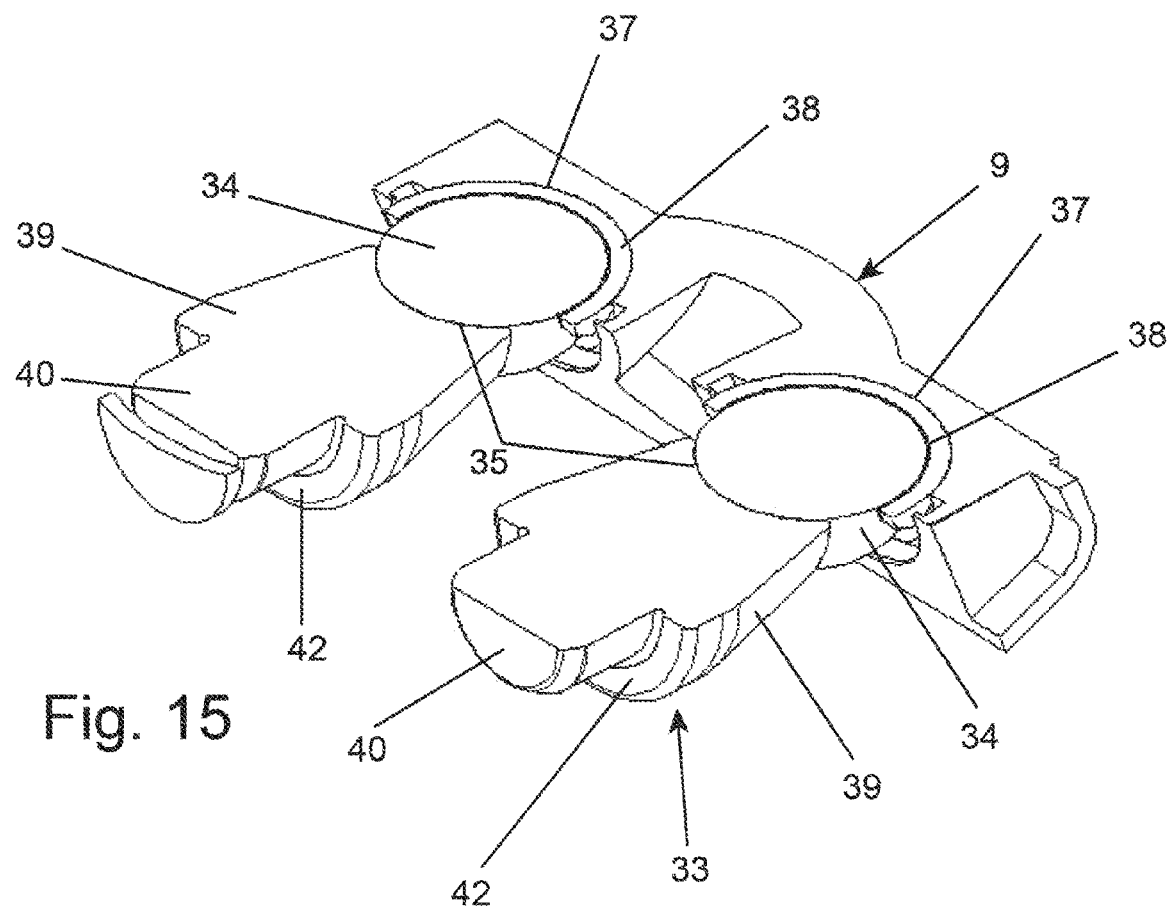
FIG. 15 shows a detail of FIG. 14 in a sectioned plan view.

FIG. 14 depicts the detail which is shown in FIG. 9 in a sectioned plan view, whereas FIG. 15 shows a detail of the brake application device 8 of FIG. 14 in a likewise sectioned plan view, the illustration of the gear mechanism 24 and the brake caliper 1 being dispensed with here.

Figure 16:
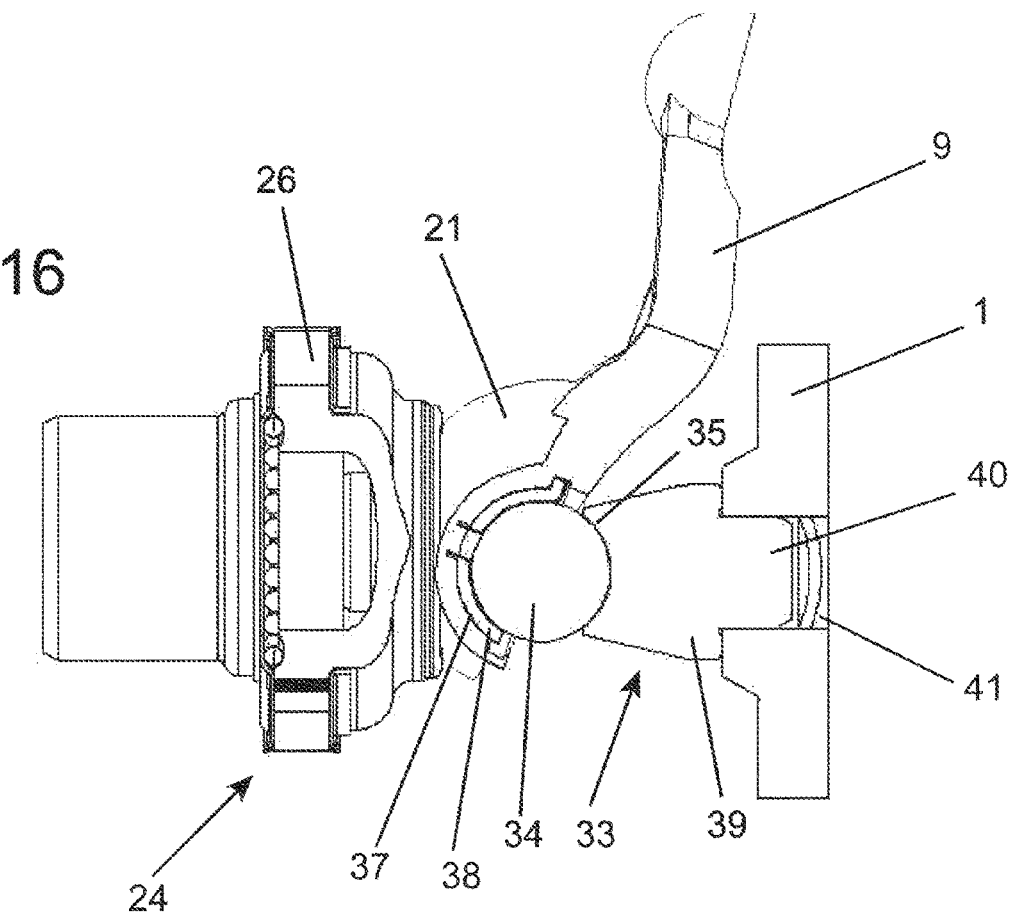
FIG. 16 shows a sectioned side view of the brake application device according to the line XVI-XVI in FIG. 14.

FIG. 16 in turn shows a sectioned side view of the brake application device 8 in accordance with the sectional line XVI-XVI in FIG. 14.

LIST OF DESIGNATIONS

1 Brake caliper
2 Brake disc
3 Brake pad
4 Threaded spindle
5 Adjuster
6 Screw
7 Threaded sleeve
8 Brake application device
9 Rotary lever
10 Pressure piece
11 Closure plate
12 Screw
13 Bellows (gaiter)
14 Compression spring
15 Compression spring
16 Eccentric
17 Depression
18 Bearing shell
19 Channel
20 Anti-friction roller
21 Section
22 Bearing shell
23 End side
24 Gearwheel mechanism
25 Gearwheel
26 Gearwheel
27 Driver device
28 Plate
29 Screw
30 Spacer sleeve
31 Sliding ring
32 Attachment
33 Bearing block
34 Ball
35 Recess
36 Ball
37 Domed depression
38 Plain bearing shell
39 Support pin
40 Journal 41 Bore
42 Supporting face The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a vehicle, comprising:
   a brake caliper which is configured to straddle a brake disc and in which a brake application device is arranged;
   a single-piece rotary lever which has an eccentric; and
   at least one brake plunger which is configured as a threaded spindle arrangement with a rotational axis, and by way of which at least one brake pad is pressable against the brake disc upon actuation of the rotary lever, wherein
   the rotary lever is arranged in the brake caliper so as to pivot relative thereto, and is supported on the brake caliper in at least one supporting region directly or via one or more elements which are connected in between,
   the rotary lever which is pivotable with respect to the brake plunger, has at least one convexly shaped section on a side which lies opposite the supporting region on the brake caliper, the at least one convexly shaped section abutting directly or via a plain bearing against a concave end side of a respective one of the at least one brake plunger which is adapted to the at least one convexly shaped section, in an axial extension of the rotational axis of the threaded spindle arrangement,
   on a side of the rotary lever which lies opposite the at least one convexly shaped section, the rotary lever is supported on at least one ball which bears against a bearing block which is held on the brake caliper,
   the ball lies in a recess which is adapted to its shape, and
   the bearing block is configured as a separate component.

2. The disc brake as claimed in claim 1, wherein the at least one convexly shaped section is configured as a spherical section.

3. The disc brake as claimed in claim 1, wherein the at least one convexly shaped section is configured as an elliptically shaped section.

4. The disc brake as claimed in claim 1, wherein the at least one convexly shaped section is configured as a section shaped in a manner of a barrel section.

5. The disc brake as claimed in claim 1, wherein the at least one convexly shaped section is configured as a cylinder section, a curvature extending in a pivoting direction of the rotary lever.

6. The disc brake as claimed in claim 1, further comprising:
   a gear mechanism wheel, which is operatively connected to an adjusting device, is arranged fixedly on the brake plunger so as to rotate with it, wherein
   the concave end side, against which the at least one convexly shaped section bears, is provided on the brake plunger or on the gear mechanism wheel.

7. The disc brake as claimed in claim 1, wherein the at least one convexly shaped section and/or the concave end side which bears against it, are precision machined by way of vibratory grinding, lapping, polishing, honing, eroding or rolling.

8. The disc brake as claimed in claim 1, wherein the at least one convexly shaped section and/or the concave end side of the brake plunger which is adapted to it are provided with a bearing shell.

9. The disc brake as claimed in claim 8, wherein the at least one convexly shaped section or the bearing shell of the rotary lever corresponds in terms of the extent in the pivoting direction of the rotary lever to a maximum pivoting travel of the rotary lever.

10. The disc brake as claimed in claim 1, wherein the at least one convexly shaped section is configured on the eccentric of the rotary lever.

11. The disc brake as claimed in claim 1, further comprising:
    at least one anti-friction body provided on the rotary lever on the side which lies opposite the at least one convexly shaped section.

12. The disc brake as claimed in claim 11, wherein at least one bearing device is provided between the anti-friction body and the rotary lever and/or between the anti-friction body and the brake caliper.

13. The disc brake as claimed in claim 12, wherein the at least one bearing device is configured as a plain bearing shell.

14. The disc brake as claimed in claim 12, wherein the at least one bearing device is configured as an anti-friction bearing shell.

15. The disc brake as claimed in claim 11, wherein a bearing shell on the at least one convexly shaped section of the rotary lever and/or a plain bearing shell are formed to receive an anti-friction body of a composite plain bearing.

16. The disc brake as claimed in claim 6, wherein the gear mechanism wheel, which is connected fixedly to the brake plunger so as to rotate with it, and an adjusting device gear mechanism wheel which corresponds therewith, are arranged in a driver device which is held on the adjusting device so as to be displaced axially but secured against rotation.

17. The disc brake as claimed in claim 16, wherein the driver device comprises two plates which are arranged parallel to and at a spacing from one another.

18. The disc brake as claimed in claim 17, further comprising:
    spacer sleeves provided in order to space the two plates apart, through which spacer sleeves screws are guided.

19. The disc brake as claimed in claim 1, wherein the bearing block has a cylindrical journal which adjoins a support pin of greater diameter and which is inserted into a bore of the brake caliper.

20. The disc brake as claimed in claim 1, wherein at least one of two bearing blocks which are arranged parallel to and at a spacing from one another is held on the brake caliper in a manner which compensates for tolerances.

21. The disc brake as claimed in claim 1, wherein the bearing block is configured as a cold pressed part.

22. The disc brake as claimed in claim 19, wherein a stepped supporting face is formed between the support pin and the journal, which supporting face extends circumferentially transversely with respect to the longitudinal axis of the bearing block, and bears against a machined bearing face of the brake caliper.

23. The disc brake as claimed in claim 22, wherein the bearing block is rotationally symmetrical.

24. The disc brake as claimed in claim 20, wherein a journal of the two bearing blocks is connected fixedly to the brake caliper.

* * * * *